(12) United States Patent
Sha

(10) Patent No.: US 6,868,057 B1
(45) Date of Patent: Mar. 15, 2005

(54) AUTOMATIC PROTECTION SWITCH DECISION ENGINE

(75) Inventor: Yung-Ching Sha, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/456,806

(22) Filed: Dec. 8, 1999

(51) Int. Cl.$^7$ ............................................. G01R 31/08
(52) U.S. Cl. .................. 370/216; 370/227; 370/228; 370/225
(58) Field of Search ................. 370/216, 227, 370/228, 225, 219, 220, 221, 217, 218; 714/4, 2, 10, 11, 13

(56) References Cited

U.S. PATENT DOCUMENTS

| | | | | |
|---|---|---|---|---|
| 5,239,537 A | * | 8/1993 | Sakauchi | 370/218 |
| 5,301,184 A | * | 4/1994 | Uriu et al. | 370/219 |
| 5,461,609 A | * | 10/1995 | Pepper | |
| 5,581,549 A | * | 12/1996 | Mochinaga | |
| 5,870,382 A | * | 2/1999 | Tounai et al. | |
| 5,870,538 A | * | 2/1999 | Manning et al. | 714/42 |
| 5,926,456 A | * | 7/1999 | Takano et al. | 370/218 |
| 6,041,037 A | * | 3/2000 | Nishio et al. | |
| 6,061,735 A | * | 5/2000 | Rogers | |
| 6,075,767 A | * | 6/2000 | Sakamoto et al. | 370/228 |
| 6,202,170 B1 | * | 3/2001 | Busschbach | |
| 6,381,221 B1 | * | 4/2002 | Legouet-Camus et al. | |
| 6,466,576 B2 | * | 10/2002 | Sekine et al. | |

* cited by examiner

Primary Examiner—Ajit Patel
Assistant Examiner—Steven Blount

(57) ABSTRACT

A decision engine decides whether to assign a service line to be active or in standby mode with a very simple decision logic that is based on a comparison between two numbers that are created through the setting of bits in two registers. The logic of the decision engine is embedded in a combination of a filter that either accepts or rejected applied stimuli, and a table that acts on accepted stimuli by the setting and resetting of bits in the two registers in accordance with a unique specification.

18 Claims, 5 Drawing Sheets

LEGEND:
A SERVICE LINE TO DESTIANTION 1
B SIMPLEX LINE TO DESTINATION 2
C PROTECTION LINE TO DESTINATION 1
D SIMPLEX LINE TO DESTINATION 3

FIG. 4

| STIMULUS \ HIGHEST PRIORITY | LOCK OUT | FORCED SWITCH | MANUAL SWITCH | RELEASE |
|---|---|---|---|---|
| LOCK OUT | REJECT | REJECT | REJECT | ACCEPT |
| SF IN PROTECTION LINE | ACCEPT | REJECT | REJECT | REJECT |
| FORCED SWITCH | ACCEPT | REJECT | REJECT | ACCEPT |
| SF IN SERIVCE LINE | ACCEPT | ACCEPT | REJECT | REJECT |
| SD IN EITHER LINE | ACCEPT | ACCEPT | REJECT | REJECT |
| MANUAL SWITCH | ACCEPT | ACCEPT | REJECT | ACCEPT |
| NO REQUEST | ACCEPT | ACCEPT | ACCEPT | REJECT |

FIG. 5

SLR:
| MSB | 6 | 5 | 4 | 3 | 2 | 1 | LSB |
|---|---|---|---|---|---|---|---|
| 0 | 0 | 0 | 0 | FS | SF | SD | MS |

PLR:
| MSB | 6 | 5 | 4 | 3 | 2 | 1 | LSB |
|---|---|---|---|---|---|---|---|
| 0 | 0 | LO | SF | FS | 0 | SD | MS |

FIG. 6

| STIMULUS | BITS SET ||
| --- | --- | --- |
| | SLR | PLR |
| MANUAL SWITCH TO MAKE PROTECTION LINE ACITVE | MS=1 | MS=0 |
| MANUAL SWITCH TO MAKE SERVICE LINE ACITVE | MS=0 | MS=1 |
| SIGNAL DEGRATED CONDITION DETECTED IN S | SD=1; MS=0 | MS=0 |
| SIGNAL DEGRATED CONDITION CLEARED IN S | SD=0 | |
| SIGNAL DEGRATED CONDITION DETECTED IN P | MS=0 | SD=1; MS=0 |
| SIGNAL DEGRATED CONDITION CLEARED IN P | | SD=0 |
| SIGNAL FAILED CONDTION DETECTED IN S | SF=1; MS=0 | MS=0 |
| SIGNAL FAILED CONDITION CLEARED IN S | SF=0 | |
| FORCED SWITCH DIRECTIVE FROM S TO P | FS=1 | FS=0 |
| FORCED SWITCH DIRECTIVE FROM P TO S | FS=0 | FS=1 |
| SIGNAL FAILED CONDTION DETECTED IN P | FS=0; MS=0 | SF=1; FS=0; MS=0 |
| SIGNAL FAILED CONDITION CLEARED IN P | | SF=0 |
| LOCKOUT | | LO=1 |
| RELEASE | SF=0; MS=0 | LO=0; FS=0; MS=0 |

S: SERVICE LINE   P: PROTECTION LINE

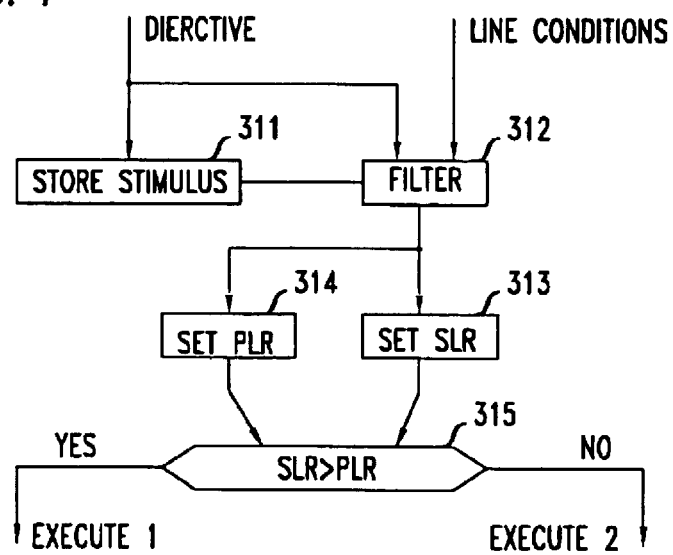

FIG. 7

AUTOMATIC PROTECTION SWITCH DECISION ENGINE

RELATED APPLICATION

This invention is related to an application filed on Nov. 20, 1999, titled "A Method for Overcoming Faults in an ATM I/O Module and Lines Connected Thereto," which bears the Ser. No. 09/444,154.

BACKGROUND OF THE INVENTION

This invention relates to ATMs and, more particularly to circumventing of faults in I/O modules of an ATM.

FIG. 1 presents a general block diagram of a conventional local ATM switch 100 with a connected I/O module 10, and conventional remote ATM switch 200 with a connected I/O module 20 (that may be of the same construction as that of module 10). Module 10 contains a line interface unit (LIU) 110 that is connected to fiber 210, and a line interface unit 120 that is connected to fiber 220. Fiber 210 is the "service" line, in the sense that it carries live data between I/O module 10 and I/O module 20. Fiber 220 is the "protection" line, in the sense that it is ready to assume the active communication function of line 210, should fiber 210 fail. Within module 10, LIU 110 is connected to framer 111, and framer 111 is connected to APS switch unit 130. Similarly, LIU 120 is connected to framer 121, and framer 121 is connected to APS switch unit 130. APS switch 130 is connected to ATM processing unit 140, and the output of ATM processing unit 140 forms the output of I/O module 10. This output is connected to ATM switch fabric 100. Elements 111, 121, 130 and 140 are connected to a control CPU 150.

Under normal operating circumstances, traffic from the service fiber (210) passes through LIU 110 and framer 111, and is applied to APS switch unit 130. The switch is set to pass this traffic to ATM processing unit 140 and thence, to ATM switch fabric 100. In the reverse direction, traffic flows from switch fabric 100 to ATM processing unit 140, and is bridged by APS switch unit 130 to both framers 111 and 121. That traffic is then transmitted out on both fibers 210 and 220. From the above it can be realized that protection fiber 220 carries signals that are identical to the signals carried in service line 210. The only difference is that APS switch 130 in I/O module 10 passes only the signal of framer 111 to switch unit 140 and, similarly, I/O module 20 at the remote destination passes only the signal of framer 123 to switch unit 145.

When a failure occurs, for example, when fiber 210 is severed, CPU 150 gets an interrupt signal via line 151 from a detector in framer 111. In response thereto, the CPU takes recovery action. First, the CPU checks to determine whether the protection line (220) is in good operating order. Upon an affirmative determination, CPU 150 orders APS switch 130 to disconnect the path from line 210 toward ATM processing unit 140, and to connect the path from line 220 to ATM processing unit 140. CPU 150 also creates an APS signal and casts it onto line 220 through framer 121, toward I/O module 20. Framer 113 at I/O module 20 provides the received APS signal to CPU 160, and CPU 160 directs APS switch unit 135 to switch the signal arriving on fiber 220 to ATM processing unit 145.

While an ATM constructed with I/O modules as shown in FIG. 1, and employed in the manner described above, is able to circumvent problems that originate in the fiber or the LIU, it nevertheless has a significant weakness. Use of the APS switch within the I/O module requires one to connect the service fiber and the protection fiber to the same I/O module. Consequently, a general failure in the I/O module brings down both the service path and the protection path. On first blush, it would appear that placing the APS switch off the I/O module, in a separate circuit board that is interfaced between the I/O module and the ATM switch, would solve the problem because it would allow the service fibers and the protection fibers to be connected to different I/O modules. Alas, current design ATMs do not have the physical room for inserting the circuit board that would serve as the switches for selecting I/O modules. Moreover, such a solution is quite expensive.

The aforementioned related application discloses an improved arrangement that operates in a novel manner by allowing the connection of the service fiber and the protection fiber to different I/O modules. The necessary switching for implementing this arrangement is achieved by closing and opening buffers in the I/O modules, as the need dictates, by cooperation between the CPUs on the I/O modules of the service and the protection lines and the ATM switch fabric. That is, the active line has its framer buffer open, while the standby line has its framer buffer closed. In the other direction, traffic is multi-cast onto both the service and the protection lines by the ATM processing unit. In this manner, the protection fiber always contains information, ready to be switched from standby mode into active mode.

The above-described scenario of what happens when a fiber such as fiber 210 is severed is but one of the conditions that the decision logic within the CPUs of the I/O modules must account for before a decision is reached as to whether to close the buffer of the service I/O module and open the buffer of the protection I/O module, or vice versa. The more complete, actual, situation is that the decision logic is responsive to various different conditions that may exist in both the service and the protection I/O modules, as; well as to a user-provided control signal from a controller that is coupled to switch fabric; 100.

As for the conditions that may be present on the service and protection I/O modules, there is the SD (signal degraded) condition and the SF (signal failed) condition. As for the inputs applied by a user, they include a manual switching directive, a forced switching directive, a lockout directive, or a Release directive.

- A manual switching directive aims to assign the protection line to be the active line, and the service line to be the standby line when there are no fault conditions, or vice versa, and, for whatever reason, the operator wishes to make the desired assignment.
- A forced switching directive aims to switch a line to the active state even if that line is in a degraded (SD) condition.
- A lockout directive aims to assign the service line (only) to be the active line without any regard to what state the service line and the protection line are in.
- The release directive voids the other directives.

Hierarchically, from the highest priority concerns for the decision logic, to the lowest priority concerns for the decision logic, the order is: lockout, SF in the protection line, FS (forced switching), SF in the service line, SD in the protection line, SD in the service line, and lastly, manual switching.

Prior art arrangements account for all inputs and for all existing conditions through a software module that implements a state machine. Such a state machine is quite large. For example, in the Lucent Technologies GV2000 ATM switch, the aforementioned state machine has about 40 states, and about 10,000 lines of C code. This can slow performance and certainly increases the cost of maintenance.

SUMMARY OF THE INVENTION

An improved arrangement is attained with a very simple decision logic that, based on a comparison between two numbers that are created through the setting of bits in two registers, either directs the service line to be in the active state or in the standby state, and conversely, directs the protection line to be in the standby state or in the active state. The decision logic is embedded in a combination of a filter that either accepts or rejected applied stimuli, and a table that acts on accepted stimuli by the setting and resetting of bits in the two registers in accordance with a unique specification.

BRIEF DESCRIPTION OF THE DRAWINGS

FIG. 4 is a table describing the action of a filter that accepts or rejects input stimuli;

FIG. 5 shows the location specifications for service and protection logic registers;

FIG. 6 shows a table that specified the locations that are set, or reset, in the registers shown in FIG. 5 in response to stimuli accepted according to the FIG. 4 table; and FIG. 7 presents a flow chart of the method disclosed herein.

DETAILED DESCRIPTION

Figure 1:
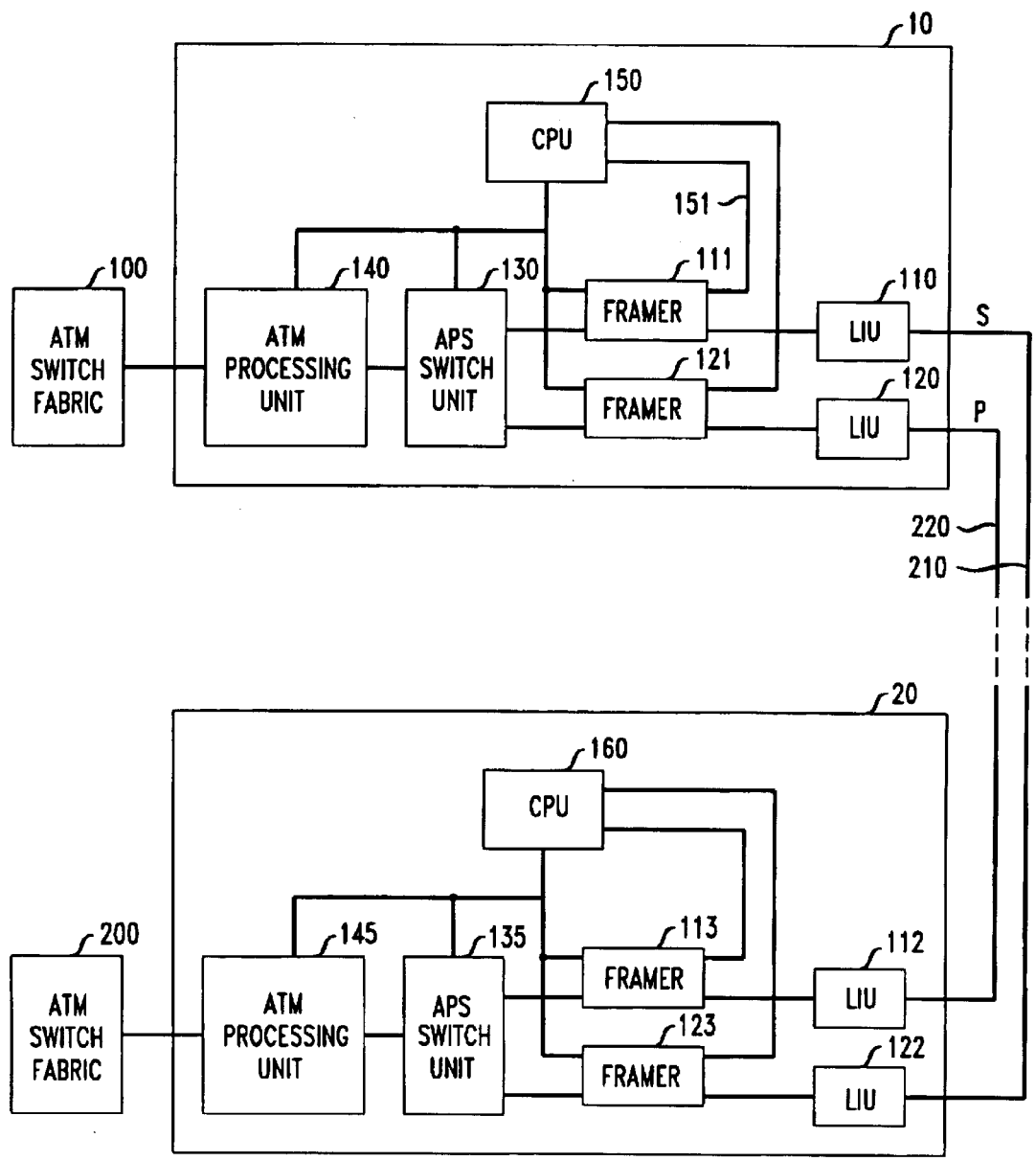
FIG. 1 illustrates a prior art ATM arrangement.
Figure 2:
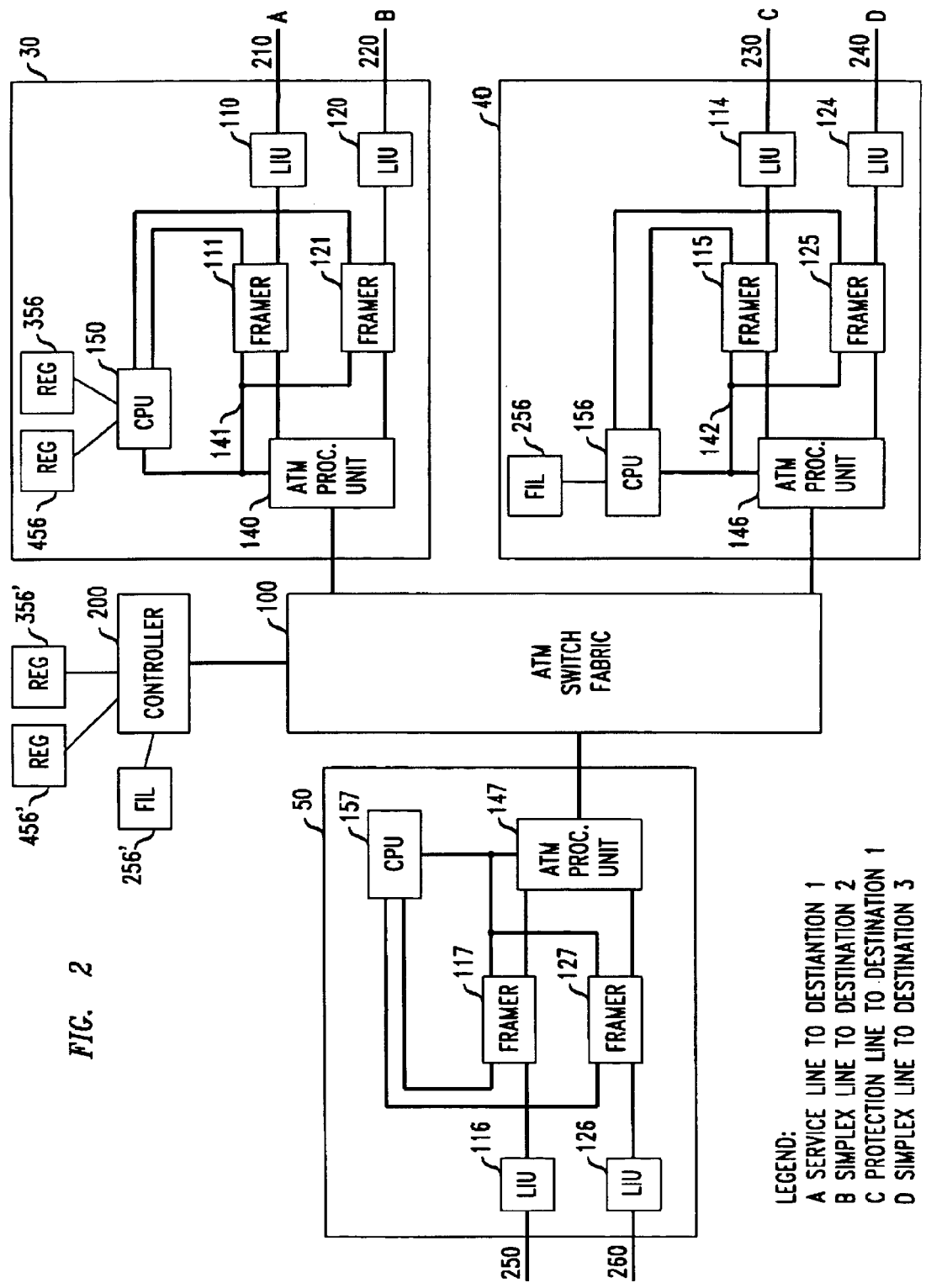
FIG. 2 presents an arrangement that comports with the principles of this invention.

FIG. 2 presents an illustrative ATM arrangement where the protection line and the service line are connected to different I/O modules. It shows an ATM switch 100 and associated I/O modules 30, and 40 and 50. Modules 30–50 differ from module 10 in that APS switch unit 130 is effectively not found in these modules. Illustratively, FIG. 2 has one duplex span to the right of ATM switch 100 that includes a service line and a protection line, and two simplex spans that do not have protection lines. To the left of ATM switch 100 there are two simplex spans. The service line of the duplex span is connected from I/O module 30 to destination 1 via fiber 210. The protection line of the duplex span is connected from I/O module 40, also to destination 1, via fiber 230. Fiber 220 is connected to LIU 120 of I/O module 30 and it forms a simplex span to a destination 2. Similarly, fiber 240 is connected to LIU 124 of I/O module 40 and it forms a simplex span to a destination 3. Fibers 250 and 260 are connected to LIUs 116 and 126, respectively, of I/O module 50.

The following exposition considers only the operation of the duplex span. Before proceeding with this exposition, however, it may be noted that, as indicated above, each framer in the illustrative embodiment of FIG. 2 includes a detector to detect loss of signal or loss of framing. Each framer also includes a buffer that can be closed or opened, so as to block the buffer from outputting any signals, or to allow signals to flow out, respectively. The CPU of the I/O module provides the signal that controls the state of the buffer. For example, the state of the buffer in framer 111 is controlled by a signal that flows on bus 141.

During normal operating conditions, data flows through fiber 210 (the service line) and LIU 110 into framer 111. This data is transferred to ATM processing unit 140 and thence to ATM switch 100. The same data is also present in fiber 230 (the protection line) but this data is blocked by an appropriate control signal on bus 142. Thus, ATM switch 100 receives only one stream of data. Presuming that the data which does reach ATM switch 100 (from I/O module 30) is addressed to framer 117 in I/O module 50, ATM switch 100 makes the transfer, and the data flows to framer 117. Thence, the data flows to fiber 250 through LIU 116. In the reverse direction, two payload data streams are created from the data of framer 117 by use of a multicast integrated circuit that is already present in conventional ATM processing units (i.e., in unit 147). One of the streams is addressed to framer 111 in I/O module 30, and the other stream is addressed to framer 115 in I/O module 40. The two streams pass through ATM switch 100 and, thus, the information is delivered to framers 11 and 115 and flows out of fibers 210 and 230, respectively. The address information in ATM processing unit 147 is maintained in a memory within the processing unit, which memory is populated by CPU 157. CPU 157 obtains this information from controller 200 that is connected to ATM switch 100 through ATM bus 201 (and in this manner is able to reach any of the I/O modules). Controller 200 maintains information for the entire switch regarding the I/O modules to which service fibers and associated protection fibers are connected.

When an SD or an SF condition is detected, for example, by framer 111, the framer sends a corresponding signal to CPU 150 on line 151 and, as in the prior art, CPU 150 takes corrective action. The corrective action process is depicted in FIG. 3.

Figure 3:
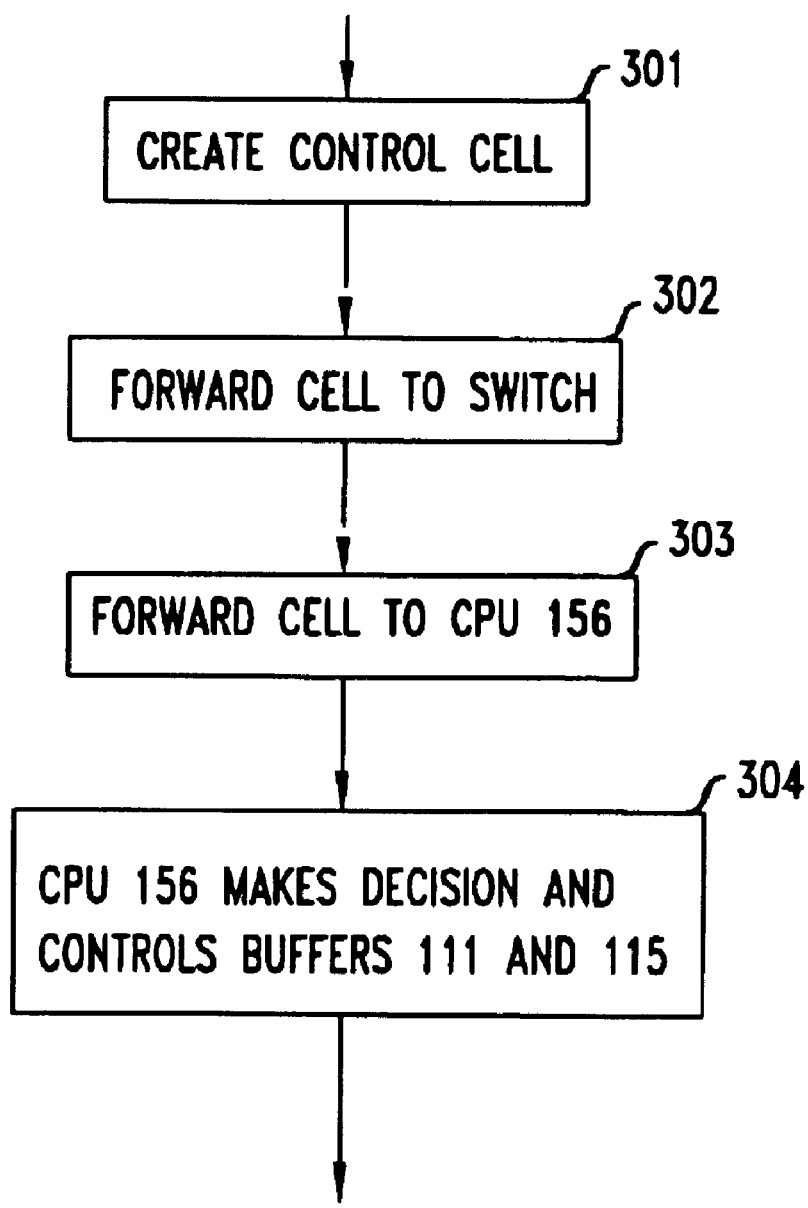
FIG. 3 is a flow chart of one process for switching operations from the service fiber to the protection fiber.

As shown in FIG. 3, in block 301 CPU 150 creates a control cell that is addressed to CPU 156. Control then passes to block 302, where the created cell is forwarded to ATM switch 100 via the ATM bus. Switch 100 forwards the created cell to CPU 156, again via the ATM bus, in block 303. Finally, in block 304 CPU 156 makes decisions about what actions, if any, should be applied to the buffers of framers 111 and 115, and executes those decisions. If the decision is to close an open buffer in framer 111 and correspondingly to open a closed buffer in framer 115 then, one of two sequences of actions can be taken: either open the buffer of framer 115 first, or close the buffer of framer 111 first. Regardless of the sequence chosen (and the choice may be made based on the type of fault condition that exists) CPU 156 creates a control cell that is addressed to CPU 150, CPU 150 received the control cell and acts on the directive it contains, and CPU 150 controls the buffer of framer 115 directly. The following discussion explains how those decisions of block 304 are arrived at.

In addition to receiving information from CPU 150, the decision logic in CPU 156 also has access to information from framer 115 and, therefore, knows whether there is an SD or and SF condition at the protection line. Further, CPU 156 receives user-requests signals from a user terminal (not shown) through controller 200 (as does CPU 150), and those user-requests specify either a lockout, a forced switch, a manual switch, or a Release directive.

In accordance with the principles disclosed herein and depicted in the flow chart of FIG. 7, the information from framer 111, framer 115, and controller 200 is applied to a decision filter 256 that is shown in FIG. 2 to be associated with CPU 156. Decision filter 256 records the most recent command from controller 200 (block 302), and develops an "Accept" (e.g., logic 1) or "Reject" (logic 0) control signal, as a function of the remembered most-recent directive from the user, and the inputs from framer 111 and 115. Operationally, FIG. 7 shows the control process, which shows that commands from controller 200 are applied to block 311, where the most recent command is stored, and the controller 200 commands as well as the other stimuli are applied to block 312, where a Accept/Reject decision logic is effected under influence of the output of block 311. The Accept/Reject signal output of block 312 dictates whether an action is taken with respect to the stimuli to CPU 156. Specifically, when the output of decision filter 256 is not at logic level 0, action is taken with respect to registers 356 and 456 within CPU 156. Otherwise, no action is taken. Register 356 is the service line register SLR, and register 456 is the protection line register PLR. Each contains an 8 bit number, with the bit map defined as shown in FIG. 4.

The action taken is a setting of various bits in the SLR and the PLR registers, in accordance with the table shown in FIG. 5, based on the directives in the table of FIG. 6. Operationally, this is done in blocks 313 and 314 of FIG. 7. Once the appropriate bits in the SLR and PLR registers are set as specified above (effectively adding or deleting from the numbers stored in registers 356 and 456), a decision is made (in block 315) as to whether to open or close the buffers of framers 115 and 111, or vice versa, as follows:

If ((service line is active) and (SLR>PLR))

```
{
    switch service line to standby;
    switch protection line to active;
{
```

If ((protection line is active) and (PLR>SLR))

```
{
    switch protection line to standby;
    switch service line to active;
{
```

The above execution code is represented in FIG. 7 by code segments "execute 1" and "execute 2."

The above discloses the principles of this invention for an arrangement like the one disclosed in the related application that was initially identified. It should be understood, however, that this invention is much broader, and is not limited to the disclosed embodiment. Illustratively, it can be applied to prior art arrangements for protecting service from fiber failures. Moreover, the control embodied in FIG. 7 can be installed the controller module (e.g., with elements 256', 356', and 456'), as well as in the IO modules, etc. Also, it should be understood that while the term "register" is used, and sometimes that designates a distinct hardware element, in the context of this invention the term includes any location in memory where data be stored.

What is claimed is:

1. An arrangement comprising:
   an ATM switch fabric;
   a controller associated with said ATM switch fabric for controlling operation of said ATM switch fabric,
   a first I/O module, coupled to said ATM switch fabric and having a framer to which a protection line is connected;
   a second I/O module, coupled to said ATM switch fabric and having a framer to which a service line is connected, said second I/O module being physically distinct from said first I/O module; and
   a decision logic module within said first I/O module that, in response to applied stimulus, where said stimulus is taken from a set including user-specified directives, state condition information of the service line, and state condition information of the protection line, develops signals that flow to said framer in said first I/O module and to said second I/O module to direct said service line to be in an active state or in a standby state and, correspondingly, to direct said protection line to be in a standby state or in an active state.

2. The arrangement of claim 1 wherein said decision logic module is implemented within said controller.

3. The arrangement of claim 1 where said decision logic module is implemented within said first I/O module, within said second I/O module, or partly within said first I/O module and partly within said second I/O module.

4. The control module of claim 1 wherein said user-specified directive are taken from a set comprising a lock-out directive, a forced switch directive, a manual switch directive, or a release directive.

5. The control module of claim 1 where said, state condition information of the protection line corresponds to a degraded condition or a failed condition in said protection line, and state condition information of or the service line corresponds to a degraded condition or a failed condition in said service line.

6. The arrangement of claim 1 wherein said second I/O modules is structurally similar to said first I/O module.

7. The arrangement of claim 1 wherein said signals that flow to said framer in said first I/O module close the last-mentioned framer when a decision by said decision logic module is to place said protection line in a standby mode.

8. The arrangement of claim 1 wherein said signals that flow to in said framer in said first I/O module close the last-mentioned framer when a decision by said decision logic module is to place said protection line in an active mode.

9. The control module of claim 1 wherein said decision logic module accepts or rejects said applied stimulus based on a hierarchical order of the stimuli in said set.

10. The control module of claim 1 wherein said decision logic module accepts or rejects said applied stimulus based on said last-provided user-specified directive and a hierarchical order of the stimuli in said set.

11. The arrangement of claim 1, wherein said decision, logic module includes an 8-bit service line register and an 8-bit protection line register, and wherein said service line register has bits 4, 5, 6 and 7 permanently set to 0, where bit 7 is the most significant bit of a number stored in said service line register, and said protection line register has its bits 2, 6, and 7 permanently set to 0, where bit 7 is the most significant bit of a number stored in said protection line register.

12. A method for controlling whether a service line connected to a first I/O module is in an active mode, and a protection line connected to a second I/O module is in a standby mode, comprising the steps of:
   receiving at said second I/O module a stimulus that may cause a change in mode in said service line and in said protection line;
   determining, based on a user-specified directive, whether to accept or reject said stimulus;
   if said step of determining concludes to accept said stimulus, setting or resetting at least one bit in a first or a second register, inclusively;
   comparing a first number that corresponds to bits in said first register to a second number that corresponds to bits in said second register; and controlling said first I/O module to set said service line to a standby mode, and controlling said second I/O module, which is physically distinct from said first I/O module, to set said protection line to an active state when said first number is greater than said second number.

13. The method of claim 12 where said first register and said second register are 8 bits each.

14. The method of claim 12 wherein said step of setting bits is carried out in accordance with the table

| | bits set | |
|---|---|---|
| Stimulus | second register | first register |
| Manual switch to make protection line active | Bit0 = 1 | Bit0 = 0 |
| Manual switch to make service line active | Bit0 = 0 | Bit0 = 1 |
| Signal degraded condition detected in service line | Bit1 = 1; Bit0 = 0 | Bit0 = 0 |
| Signal degraded condition cleared in service line | Bit1 = 0 | |
| Signal degraded condition detected in protection line | Bit0 = 0 | Bit1 = 1; Bit0 = 0 |
| Signal degraded condition cleared in protection line | | Bit1 = 0 |
| Signal failed condition detected in service line | Bit2 = 1; Bit0 = 0 | Bit0 = 0 |
| Signal failed condition cleared in service line | Bit2 = 0 | |
| Forced switch directive from service to protection | Bit3 = 1 | Bit3 = 0 |
| Forced switch directive from protection to service | Bit3 = 0 | Bit3 = 1 |
| Signal failed condition detected in protection line | Bit3 = 0; Bit0 = 0 | Bit4 = 1; Bit3 = 0; Bit0 = 0 |
| Signal failed condition cleared in protection line | | Bit4 = 0 |
| Lockout | | Bit5 = 1 |
| Release | Bit2 = 0; Bit0 = 0 | Bit5 = 0; Bit3 = 0; Bit0 = 0. |

15. An I/O module, designated an A module, including a line interface unit adapted to be connected to a type A line, a framer connected to the line interface unit, an ATM processing units interposed between the framer and an ATM port of said I/O module, which port is adapted to be connected to an ATM switch, and a processor coupled to the framer and the ATM processing unit, characterized in that:

said processing unit determines, based on information derived from said line interface unit, or from signals arriving at said ATM port, whether said framer should be closed, or opened, and when said processing unit determines that said framer should be open said processing unit sends a signal to said ATM port to close a framer of another I/O module, designated a B module, which is physically distinct from said A module.

16. The A-designated I/O module of claim 15 where said B module is connected to a type B line, where type A line and type B line carry signal from a common point.

17. The A module of claim 15 where said type A stands for a service signal line, and type B stands for a protection signal line, or vice versa.

18. An arrangement comprising:

an ATM switch fabric;

a controller associated with said ATM switch fabric for controlling operation of said ATM switch fabric, a first I/O circuit card, connected to said ATM switch fabric and having a framer to which a protection line is connected;

a second I/O circuit card, connected to said ATM switch fabric and having a framer to which a service line is connected, said second I/O circuit card being physically distinct from said first I/O circuit card; and a decision logic module within said first I/O module that is adapted to respond to whichever stimulus is applied thereto from a set including user-specified directives, operational state information of the service line, and operational state information of the protection line, which module develops a signal that flows to said framer within said first I/O module and a signal that flows to said second I/O module, to direct said service line to be in an active state or in a standby state and, correspondingly, to direct said protection line to be in a standby state or in an active state.

* * * * *